Patented May 25, 1943

2,320,089

UNITED STATES PATENT OFFICE 2,320,089

ACYL ACRYLAMIDE AND ITS PREPARATION

Joy G. Lichty, Stow, Ohio, assignor to Wingfoot Corporation, Akron, Ohio, a corporation of Delaware No Drawing. Application January 19, 1940, Serial No. 314,634

8 Claims. (Cl. 260—561)

This invention relates to acyl acrylamides and includes methods of preparing them. Diacyl acrylamides and their preparation are protected in my companion application Serial No. 451,944, filed July 22, 1942. Copolymers formed from acyl acrylamides and the method of preparing them are covered in my companion application Serial No. 451,945, filed July 22, 1942.

In accordance with the terms of the invention, it has been found that acrylo nitrile and those substituted acrylo nitriles in which the carbon atom alpha to the nitrile group is substituted by alkyl, monovalent alkylene, aryl or halogen radicals and the beta carbon atom is unsubstituted, can be reacted with an alcohol, a carboxylic acid or an anhydride of a carboxylic acid to yield substances which contain unsaturated linkages and are polymerizable to produce plastic masses.

Among the acrylo nitriles and related compounds which may be used in the reaction are acrylonitrile, methacrylonitrile, ethylacrylonitrile, propylacrylonitrile, and other alpha alkyl acrylonitriles. Also, there may be employed phenyl acrylonitrile, vinyl acrylonitrile, chloro acrylonitrile, and bromo acrylonitrile.

Any of the foregoing may be reacted with one of the following: methyl alcohol, ethyl alcohol, propyl alcohol, normal butyl alcohol, isobutyl alcohol, cyclohexanol, acetic acid, propionic acid, butyric acid, acetic anhydride, propionic anhydride, butyric anhydride, and iso butyric anhydride. Of course, it will be understood that other alcohols, carboxylic acids and other anhydrides may also be used, the foregoing being mentioned as illustrative because they are most available.

The conditions employed in reacting the acrylonitrile body with the alcohol, acid or anhydride, may be any which will effect the combination, equimolecular proportions ordinarily being employed, although these proportions may be varied, the reaction usually being monomolecular regardless of the proportions present. A temperature of 80°–200° C. is sufficient in most cases, although temperatures both below and above these limits may sometimes be used, superatmospheric pressure being incidentally generated at the higher temperatures, since a closed vessel, such as an autoclave, must be employed to confine the reaction. An acid catalyst is usually necessary when an alcohol is being reacted, any of the customarily employed acid catalysts being effective, such as sulfuric acid, para toluene sulfonic acid, or phosphoric acid.

The process may be illustrated by the following examples.

Example 1

A 240-gram portion of isopropyl alcohol and 72 grams of water were added to 600 grams of concentrated sulfuric acid while effectively cooling. This was followed with the addition of 2 grams of bronze powder and one gram of hydroquinone. The mixture was agitated and maintained at a temperature of 80–110° C. during the addition of 268 grams of methacrylonitrile. The resulting mass was heated to 100–120° C. under a reflux condenser for a period of 1½ hours. At this stage, the reaction product was cooled slightly and a solution consisting of 360 grams of isopropyl alcohol and 36 grams of water was added. The reaction product was then heated to about 90° C. on a steam bath for 25 hours. Five hundred cc. of water was added and the upper layer was removed and dried.

A fraction boiling at 104–120° C./25 mm. contained 148 grams of a solid representing a yield of 29.2%. This solid melted at 90–91° C. on recrystallizing from gasoline. Analysis for N-isopropyl methacrylamide:

Per cent N found, 10.98, 10.95, 10.90. Calculated 11.03. The identity of the compound was fixed by synthesizing the material from methacrylyl chloride and isopropyl amine and obtaining a mixed melting point of the two materials, which showed no depression. The reaction, therefore, is as follows:

Example 2

A solution of 41 cc. of methacrylonitrile and 47 cc. of acetic anhydride was sealed in a glass tube and heated to 200° C. in an electric furnace for 2½ hours. Upon cooling, there was obtained a yellow liquid containing a gel. The gel was dissolved in acetone and precipitated in alcohol to give a solid which melted in part at 195° C. The reaction is believed to proceed as follows:

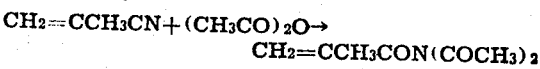

Example 3

A reaction similar to that in Example 2 was carried out using 28.5 cc. of glacial acetic acid and 41 cc. of methacrylonitrile. This mixture was heated in a closed tube to 200° C. for 2½ hours. Evaporation of the reaction product gave a yield of 7.3 grams. The reaction is as follows:

$$CH_2=C(CH_3)CN + CH_3COOH \rightarrow CH_2=C(CH_3)-CO-NH-CO-CH_3$$

The processes described above may readily be applied to the preparation of reaction products of any of the acrylonitrile type compounds mentioned with any of the alcohols, acids or acid anhydrides set forth. They may also be employed to react other substances of the classes described and illustrated. The compounds obtained may be termed, respectively, alkyl acrylamides of the general formula $$CH_2=C-CO-NH-R$$
$$\phantom{CH_2=}|$$
$$\phantom{CH_2=C-CO-NH-}X$$

acyl acrylamides of the general formula $$CH_2=C-CO-NH-CO-R$$
$$\phantom{CH_2=}|$$
$$\phantom{CH_2=C-}X$$

and diacyl acrylamides of the general formula $$CH_2=C-CO-N(CO-R)_2$$
$$\phantom{CH_2=}|$$
$$\phantom{CH_2=C-}X$$

in each of which formulae X designates hydrogen, alkyl, monovalent alkylene, aryl or halogen and R designates an alkyl radical in the case of the alkyl compounds and an alkyl or aryl radical in the case of the acyl and diacyl compounds. Of these, the mono. acyl and diacyl acryl amides, substituted or unsubstituted on the alpha carbon atom of the acrylo radical, are new compounds not heretofore described so far as known. Thus, acetyl methacrylamide and diacetyl methacrylamide are believed to be new compounds.

In general, it may be said that the reaction applies to those acrylo nitrile type compounds which may be substituted or not in the alpha carbon atom of the acrylo radical and in which the beta carbon atom is not substituted, the latter carrying only two hydrogen atoms in all instances.

While there have been described above certain preferred embodiments of the invention, it will be apparent that various changes and modifications may be made therein without departing from the spirit of such invention. Accordingly, the invention is to be limited only by the appended claims in which it is intended to set forth all features of patentable novelty residing therein.

What I claim is:

1. A method of preparing an alkacyl acrylamide which comprises heating together under acid conditions an acrylonitrile and a mono-basic aliphatic acid to combine the same in equimolecular proportions.

2. A method of preparing an alkacyl acrylamide which comprises heating together under acid conditions an acrylonitrile and a mono-basic aliphatic acid at a temperature of about 100 to about 200° C.

3. The alkacyl acrylamides in which each alkacyl group present is made up of a carbonyl group and an alkyl radical, the alpha carbon atom of the acryl radical carries one of the group consisting of a hydrogen atom, a hydrocarbon radical and a halogen radical, and the beta carbon atom carries only two hydrogen atoms.

4. The alkacyl acrylamides in which each carbonyl group present carries an alkyl substituent, the alpha carbon atom of the acryl radical carries one of the group consisting of a hydrogen atom, a hydrocarbon radical and a halogen radical, and the beta carbon atom carries only two hydrogen atoms.

5. The dialkacyl acrylamides in which each alkacyl group is made up of a carbonyl group and an alkyl radical, the alpha carbon atom of the acryl radical carries one of the group consisting of a hydrogen atom, a hydrocarbon radical and a halogen radical, and the beta carbon atom carries only two hydrogen atoms.

6. The acetyl acrylamides in which the alpha and beta carbon atoms of the acryl radical carry only hydrogen.

7. Compounds of the general formula $$CH_2=C-CO-N(CO-R)_n$$
$$\phantom{CH_2=}|$$
$$\phantom{CH_2=C-}X$$

where X is selected from the group consisting of hydrogen, hydrocarbon and halogen, R is an alkyl radical and n is a whole number from one to two, N being replaced by NH when n is one.

8. Acetyl methacrylamide.

JOY G. LICHTY.